(12) United States Patent
Xie et al.

(10) Patent No.: US 11,359,951 B2
(45) Date of Patent: Jun. 14, 2022

(54) MULTIPHASE FLOW METERS AND RELATED METHODS

(71) Applicant: Schlumberger Technology Corporation, Sugar Land, TX (US)

(72) Inventors: Cheng-Gang Xie, Singapore (SG); Baptiste Germond, Singapore (SG); Guillaume Jolivet, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/570,497

(22) PCT Filed: Apr. 29, 2016

(86) PCT No.: PCT/US2016/030165
§ 371 (c)(1),
(2) Date: Oct. 30, 2017

(87) PCT Pub. No.: WO2016/176596
PCT Pub. Date: Nov. 3, 2016

(65) Prior Publication Data
US 2018/0143052 A1 May 24, 2018

Related U.S. Application Data

(60) Provisional application No. 62/155,331, filed on Apr. 30, 2015.

(51) Int. Cl.
*G01F 1/74* (2006.01)
*G01F 1/44* (2006.01)
(Continued)

(52) U.S. Cl.
CPC ............. *G01F 1/74* (2013.01); *E21B 43/34* (2013.01); *E21B 49/08* (2013.01); *E21B 49/087* (2013.01);
(Continued)

(58) Field of Classification Search
USPC ........................................... 73/861.04
See application file for complete search history.

(56) References Cited

U.S. PATENT DOCUMENTS 4,091,835 A 5/1978 Frampton
4,144,754 A * 3/1979 Pitts, Jr. .................. G01F 1/34
73/861.02

(Continued)

FOREIGN PATENT DOCUMENTS

CN 203216545 9/2013
DE 9218091 7/1993
(Continued)

OTHER PUBLICATIONS

Office Action issued in the related RU Application 2018104459 dated Sep. 20, 2018 (14 pages).
(Continued)

*Primary Examiner* — Peter J Macchiarolo
*Assistant Examiner* — Mohammed E Keramet-Amircolai
(74) *Attorney, Agent, or Firm* — Rodney Warfford (57) ABSTRACT

Multiphase flow meters and related methods are disclosed herein. An example apparatus includes an inlet manifold; an outlet manifold, first and second flow paths coupled between the inlet and outlet manifolds; and an analyzer to determine a flow rate of fluid flowing through the first and second flow paths based on a parameter of the fluid flowing through the first flow path.

15 Claims, 8 Drawing Sheets

(51) Int. Cl.
  *G01F 5/00* (2006.01)
  *G01F 7/00* (2006.01)
  *G01F 15/00* (2006.01)
  *E21B 49/08* (2006.01)
  *G01F 25/10* (2022.01)
  *E21B 43/34* (2006.01)
  *G01F 1/66* (2022.01)

(52) U.S. Cl.
  CPC .............. *G01F 1/44* (2013.01); *G01F 1/66* (2013.01); *G01F 5/00* (2013.01); *G01F 5/005* (2013.01); *G01F 7/00* (2013.01); *G01F 7/005* (2013.01); *G01F 15/005* (2013.01); *G01F 25/10* (2022.01)

(56) References Cited

U.S. PATENT DOCUMENTS

| | | | |
|---|---|---|---|
| 4,760,742 | A | 8/1988 | Hatton |
| 5,390,547 | A | 2/1995 | Liu |
| 5,589,642 | A | 12/1996 | Agar et al. |
| 5,741,977 | A | 4/1998 | Agar et al. |
| 6,532,826 | B1 | 3/2003 | Dou |
| 7,654,151 | B2 | 2/2010 | Agar et al. |
| 7,661,302 | B2 | 2/2010 | Gysling |
| 7,717,000 | B2 | 5/2010 | Xie et al. |
| 7,908,930 | B2 | 3/2011 | Xie et al. |
| 7,942,065 | B2 | 5/2011 | Xie |
| 8,536,883 | B2 | 9/2013 | Xie et al. |
| 8,606,531 | B2 | 12/2013 | Pinguet et al. |
| 8,641,813 | B2 | 2/2014 | Gysling |
| 8,915,145 | B1* | 12/2014 | Van Orsdol ............... G01F 1/74 73/861.04 |
| 2005/0241410 | A1* | 11/2005 | Wium .................... G01F 15/18 73/861.04 |
| 2008/0034886 | A1* | 2/2008 | Inagaki .................... G01F 1/68 73/861.21 |
| 2009/0000389 | A1* | 1/2009 | Redon ...................... G01F 5/00 73/861 |
| 2010/0089174 | A1* | 4/2010 | Van Cleve ............. G01N 9/002 73/861.357 |
| 2010/0145634 | A1 | 6/2010 | Pinguet et al. |
| 2010/0198531 | A1 | 8/2010 | Bell et al. |
| 2010/0305880 | A1* | 12/2010 | Oddie ...................... G01F 1/74 702/47 |
| 2011/0283809 | A1* | 11/2011 | Pihlaja .................... G01F 15/08 73/861.04 |
| 2012/0000643 | A1 | 1/2012 | Bruun et al. |
| 2012/0017697 | A1* | 1/2012 | Benzo ...................... G01F 1/74 73/861.04 |
| 2012/0242081 | A1* | 9/2012 | Keays .................. F16L 27/053 285/145.3 |
| 2012/0325751 | A1 | 12/2012 | Renick et al. |
| 2013/0206420 | A1* | 8/2013 | McHugh ............... E21B 34/045 166/351 |
| 2013/0266829 | A1* | 10/2013 | Cole ..................... H01M 8/188 429/51 |
| 2013/0327154 | A1 | 12/2013 | Xie et al. |
| 2014/0007696 | A1* | 1/2014 | Al-Hadhrami ............ G01F 1/74 73/861.04 |
| 2014/0041463 | A1 | 2/2014 | Vethe et al. |
| 2014/0137643 | A1* | 5/2014 | Henry ....................... G01F 1/84 73/152.31 |
| 2014/0190238 | A1* | 7/2014 | Mcanally ............... G01H 13/00 73/30.01 |
| 2014/0331783 | A1* | 11/2014 | Xie ........................ G01F 1/662 73/861.04 |
| 2015/0185062 | A1* | 7/2015 | Ahmad .................. G01F 15/08 73/861.04 |
| 2017/0010139 | A1 | 1/2017 | Vilstrup et al. |
| 2018/0010944 | A1 | 1/2018 | Xie et al. |

FOREIGN PATENT DOCUMENTS

| | | | |
|---|---|---|---|
| EP | | 1744131 A1 | 1/2007 |
| EP | | 2171407 A1 | 4/2010 |
| WO | WO2002088519 A1 | | 11/2002 |

OTHER PUBLICATIONS

European Search Report issued in the related EP Application 16821890.7 dated Nov. 7, 2018 (3 pages).
Office Action issued in the related EP Application 16821890.7 dated Nov. 19, 2018 (3 pages).
International Preliminary Report on Patentabilitly issued in the related PCT application PCT/US2016/041036 dated Jan. 9, 2018 (10 pages).
International Search Report and Written Opinion issued in the related PCT application PCT/US2016/041036 dated Nov. 1, 2016 (14 pages).
International Search Report and Written Opinion issued in the related PCT application PCT/US2016/030165 dated Aug. 4, 2016 (13 pages).
Office Action issued in the related RU application 2017141565 dated Jun. 20, 2018 (12 pages).
International Search Report and Written Opinion issued in the related PCT application PCT/US2018/023447 dated Jul. 9, 2018 (15 pages).
Office action issued in the related U.S. Appl. No. 15/973,133 dated Jul. 30, 2018 (16 pages).
Office Action issued in the related U.S. Appl. No. 15/204,207, dated Aug. 2, 2018 (23 pages).
Office Action issued in the related CN application 201680039205.8, dated Nov. 23, 2018 (13 pages).
Decision of Grant issued in the related RU application 2017141565 dated Nov. 30, 2018 (18 pages).
Second Office Action Received in Chinese Patent Application No. 2016080039205.8 dated Sep. 12, 2019, 9 pages with English Summary.
International Preliminary Report on Patentability issued in the related PCT application PCT/US2018/023447 dated Oct. 3, 2019 (14 pages).

* cited by examiner

MULTIPHASE FLOW METERS AND RELATED METHODS

CROSS-REFERENCE TO RELATED APPLICATIONS

The present application claims priority to U.S. Provisional Application Ser. No. 62/155,331, which was filed on Apr. 30, 2015, and is incorporated herein by reference in its entirety.

BACKGROUND

This disclosure relates generally to hydrocarbon production and, more particularly, to multiphase flow meters and related methods.

DESCRIPTION OF THE RELATED ART

Hydrocarbons are widely used as a primary source of energy and have a great impact on the world economy. Consequently, the discovery and efficient production of hydrocarbon resources is increasingly noteworthy. As relatively accessible hydrocarbon deposits are depleted, hydrocarbon prospecting and production has expanded to new regions that may be more difficult to reach and/or may pose new technological challenges. During typical operations, a borehole is drilled into the earth, whether on land or below the sea, to reach a reservoir containing hydrocarbons. Such hydrocarbons are typically in the form of oil, gas, or mixtures thereof that may be brought to the surface through the borehole.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example apparatus includes an inlet manifold; an outlet manifold, first and second flow paths coupled between the inlet and outlet manifolds; and an analyzer to determine a flow rate of fluid flowing through the first and second flow paths based on a parameter of the fluid flowing through the first flow path.

An example apparatus includes an inlet manifold; an outlet manifold; first and second flow paths coupled between the inlet and outlet manifolds; and means for determining a characteristic of fluid flowing through the first and second flow paths without directly measuring a parameter of the fluid flowing through the second flow path.

An example method includes determining a parameter of a fluid flowing through a first flow path of a multiphase flow meter at a wellsite; and based on the parameter, determining a flow rate through the first flow path and a second flow path without directly measuring the flow rate through the second flow path.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Well testing is often performed to help evaluate the possible production value of a reservoir. During well testing, a test well is drilled to produce a test flow of fluid from the reservoir. During the test flow, parameters such as fluid pressure and fluid flow rate may be monitored over a period of time. The response of those parameters may be determined during various types of well tests, such as pressure drawdown, interference, reservoir limit tests and/or other tests. The data collected during well testing may be used to assess the economic viability of the reservoir. The costs associated with performing the testing operations may be substantial. As such, testing operations may be performed as efficiently and economically as possible.

To efficiently and economically perform such well testing operations, some characteristics of the fluid(s) being produced may be determined such as, for example, the flow rate of the fluid. In some examples, the fluid(s) being produced includes multiphase fluids such as, for example, water, oil, and/or gas. Determining the flow rate of a multiphase fluid may be more complex than determining the flow rate of a single phase fluid.

In some examples, to measure the flow rates of multiphase fluids, the multiphase fluid is separated by phase using a separator and the respective phases are measured to determine the flow rate of the fluids being produced. In other examples, to measure flow rates of multiphase fluids, the multiphase fluid is measured using an example multiphase flow meter without separating the multiphase fluid into phases. In an example in which the separator is used to determine characteristics of the fluid, the apparatus is larger and/or heavier than the apparatus that does not use a separator to determine characteristics of the fluid.

In some examples, multiphase flow meters include different Venturi throat sizes that enable the multiphase flow meters to be used with different liquid-and-gas production flow rates. In some examples, the Venturi throat inner-diameter sizes may include 19 millimeters (mm), 29 mm, 40 mm, 65 mm, etc. where larger Venturi throat sizes may be used for higher-rate oil/gas wells and smaller Venturi throat sizes may be used for lower-rate oil/gas wells.

In some examples, if the Venturi throat size exceeds a threshold diameter, the characteristics of the fluid may be less determinable. For example, the phase-fraction measurements across Venturi throats having a larger diameter (e.g., 88 mm) may have an increased level of uncertainty. In some examples, the increased level of uncertainty in the measurements may be caused by increased transmission attenuation (e.g., reduced count rate) when brine salinity is relatively high during a full-water calibration of the gamma-ray system and/or when the water fraction is intermittently high during flows of high water cut liquid plugs (e.g., slugs).

In some examples, to enable the characteristics of the fluid to be determinable while also accommodating different oil and gas production flow rates, first and second flow paths may be used within an example multiphase flow meter where each flow path includes a Venturi section having a throat diameter of less than approximately 88 mm. To enable characteristics of the fluid flowing through the respective Venturi sections to be determined, each Venturi section includes a measurement unit (e.g., a gamma-ray source and a gamma-ray detector). In some examples, the first flow path has a first diameter (e.g., 19 mm) and the second flow path has a second diameter (e.g., 40 mm).

In other examples, the multiphase flow meters disclosed herein include first and second flow paths and/or Venturi sections having substantially the same internal diameter and/or sizing where the first flow path includes a measurement device that measures characteristics of the fluid flowing through the first flow path and the second flow path does not include such a measurement device. Thus, measurements associated with the first flow path may be used to determine attributes of the fluids flowing through the second flow path.

In some examples, a flow rate through the first flow path is substantially similar to a flow rate through the second flow path. As used herein, a substantially similar flow rate means that the flow rates are within approximately 2 percent of one another. In some examples, a differential pressure across a first Venturi of the first flow path is substantially similar to a differential pressure across a second Venturi of the second flow path. As used herein, a substantially similar pressure differential means that the pressure differentials are within approximately 1 percent of one another.

In some examples, the multiphase flow meters disclosed herein include an example inlet manifold (e.g., an equal flow inlet manifold) that splits the flow rate between the first and second flow paths substantially equally. As used herein, splitting the flow rate between the first and second flow paths substantially equally means that the flow rate through the first flow path and the flow rate through the second flow path are within approximately 2 percent of one another. In some examples, the first and second flow paths are disposed downstream of the example inlet manifold. In some examples, the first and second flow paths have a Venturi throat size of approximately 65 mm to enable relatively accurate count rate and/or phrase fraction measurements. In some examples, when a relatively large swirl is present in the gas-liquid flow entering the example multiphase flow meter, a flow straightener is included at an inlet section of the inlet manifold.

In some examples, the multiphase flow meters disclosed herein include an example outlet manifold (e.g., an equal flow outlet manifold) that receives the fluids flowing through the first and second flow paths at a substantially equal rate. In some examples, the first flow path and the second flow path are spaced the same distance to an inlet of the inlet manifold. In some examples, the first flow path and the second flow path are spaced the same distance to an inlet of the outlet manifold. Thus, in some examples, the multiphase flow meters are symmetric along an axis that intersects and/or bifurcates the inlets of the inlet manifold and the outlet manifold.

In examples in which the flow through the first flow path is substantially equal to the flow through the second flow path, determined characteristics of the fluid flowing through the first flow path may be used to determine characteristics of the fluid flowing through the second flow path. As such, the measurements of the flow rate through the first flow path may be used to determine the flow rate through the second flow path and a fluid sensor(s) and/or a flow sensor(s) may be disposed at and/or adjacent to the first flow path and no fluid sensor(s) and/or flow sensor(s) may be disposed on the second flow path. Thus, the examples disclosed herein reduce cost by instrumenting one of the two flow paths and not instrumenting the other of the two flow paths. The examples disclosed herein reduce cost by including nuclear windows, nuclear source and detector housings, pressure and temperature ports and/or mountings for instruments on one of the two flow paths and not including the nuclear windows, nuclear source and detector housings, the pressure and temperature ports and/or the mountings for instruments on the other of the two flow paths.

In some examples, the fluid sensor(s) and/or flow sensor(s) include a gamma-ray source, a gamma-ray detector, a flow computer and/or a multivariable transmitter where the variables are associated with difference in pressure ($\Delta P$), pressure (p) and/or temperature. In some examples, to control the flow through the second flow path depending on the flow rate through the example multiphase flow meter and/or enable flow through one or both of the first and second flow paths, the multiphase flow meter includes an example valve. The valve may be a manual full-bore valve, an automated full-bore valve, a ball valve, a sliding valve, etc. In some examples, the valve actuates to enable a pressure difference through the first Venturi section of the first flow path to be between about 50 millibar (mbar) and 5000 mbar. In some examples, the valve opens when a time-averaged pressure difference across the first Venturi section of the first flow path is approximately 5000 mbar. In some examples, the valve closes when the time-averaged pressure difference across the first Venturi section of the first flow path is approximately 50 mbar.

Equation 1 may be used to determine the total flow through the multiphase flow meter where the scaling factor corresponds to the percentage and/or amount of flow added to the total flow rate by the second flow path.

$$\text{Total Flowrate} = \text{scaling factor} \times \text{flowrate of first flow path} \quad \text{Equation 1:}$$

In some examples, Equations 2-5 may be used to determine the multiphase flow rate ($Q_m$) through the first flow path based on the pressure difference ($\Delta P_v$) across the first Venturi section and the gas-liquid mixture density value ($\rho_m$) determined based on measurements associated with the source and/or the detector (e.g., fluid measurement devices). Referring to equation 2, $Q_m$ refers to the multiphase-flow total mass flow rate, $A_v'$ is defined by Equation 3, $A_v$ refers to the area of the throat of the Venturi and Is defined by Equation 4, $d_v$ refers to the Inner throat diameter of the Venturi, $\Delta P_v$ refers to the Venturi differential pressure, $\rho_m$ refers to the gamma-ray gas-liquid mixture density, $\beta$ refers to the throat-to-inlet diameter ratio (e.g., 0.5 for the Vx Spectra) and $C_d$ refers to the Venturi discharge coefficient.

$$Q_m = A_v' \times C_d \times \sqrt{2\Delta P_v \rho_m} \quad \text{Equation 2}$$

$$A_v' = \frac{A_v}{\sqrt{1-\beta^4}} \quad \text{Equation 3}$$

$$A_v = \frac{\pi}{4} d_v^2. \quad \text{Equation 4}$$

Equation 5 may be used to express the gas-liquid mixture density ($\rho_m$) where $\rho_L$ refers to the liquid density, $\rho_g$ refers to the gas density and $\alpha_L$ refers to the liquid fraction, $$\rho_m = \rho_L \alpha_L + \rho_g(1-\alpha_L) \quad \text{Equation 5:}$$

In examples in which the fluid flow through the first flow path is substantially equal to the fluid flow through the second flow path and the valve is open enabling fluid flow through the second flow path, the scaling factor may be two. Thus, in examples in which the valve is fully open and the gas/liquid flow through the first and second flow paths are relatively stable and substantially equal, the total gas, oil and water flow rates through the multiphase flow meter may be twice that measured by the instruments at the first flow path.

In examples in which the fluid flow through the first flow path is different from the fluid flow through the second flow path and the valve is open enabling fluid flow through the second flow path, the scaling factor may be a number other than two (e.g., 1.5, 2.2, 2.7, etc.). In examples in which a diameter of the first flow path is fixed and a diameter of the second flow path is variable, the scaling factor may be dynamically adjusted based on a difference of the sizes of the first and second flow paths and/or a difference of the flowrates of the first and second flow paths. In examples where the valve is closed preventing and/or deterring fluid flow through the second flow path, the scaling factor may be one. In some examples, a turndown ratio and/or rangeability of the example multiphase flow meter operating from the single Venturi mode (e.g., fluid flowing through the first flow path) to the dual Venturi mode (e.g., fluid flowing through the first and second flow paths) changes from 20:1 to 10:1.

As used herein, the turndown ratio and/or the rangeability refers to the range of flow that enables measurements made by example multiphase flow meter to satisfy a threshold of accuracy.

In some examples, to verify that the flow rate through the first flow path is substantially equal to the flow rate through the second flow path, a differential pressure sensor(s) is added to the second flow path. To compare the flow rates through the first and second flow paths, a first pressure difference across the first flow path is compared to a second pressure difference across the second flow path to determine if the difference between the first and second pressure differences satisfy a threshold. In examples in which the difference between the first and second pressure differences do not satisfy the threshold, when determining the flow rate through the example multiphase flow meter, the scaling factor may be dynamically adjusted from, for example, 2.0 to 1.9. In some examples, the difference between the first and second pressure differences may not satisfy a threshold because the valve controlling fluid flow to the second flow is partially closed.

In some examples, to determine the health of the valve controlling fluid flow to the second flow path, the differential pressure sensor(s) at the second flow path may be used to identify fluid flow through the second flow path. If fluid flow is identified through the second flow path when the valve is in the closed position, an alert may be provided to replace and/or perform maintenance on the valve because the valve may be leaking.

Figure 1:
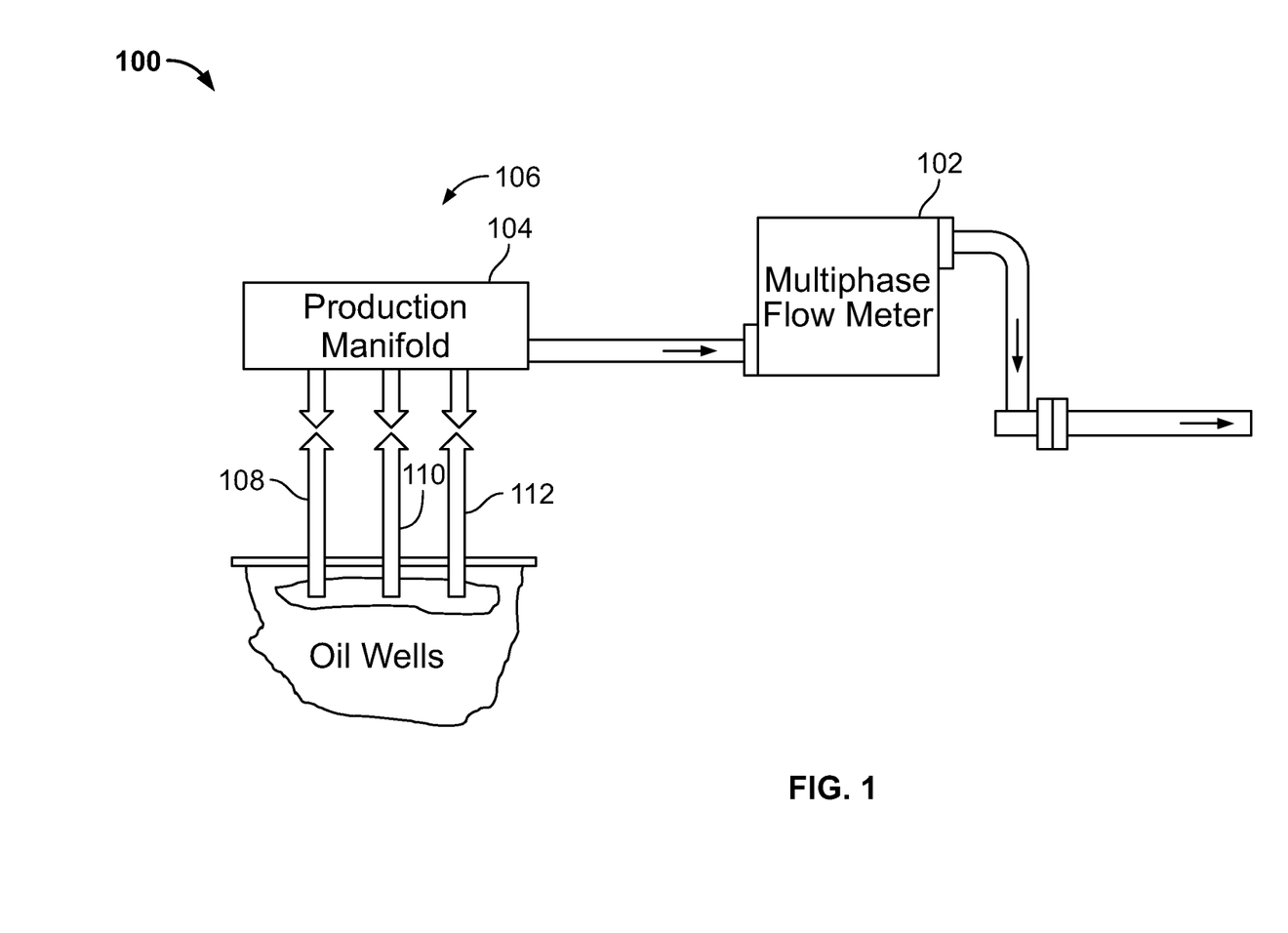
FIG. 1 illustrates an example multiphase flow meter coupled to a wellhead.

FIG. 1 illustrates an example wellsite 100 including an example multiphase flow meter 102 in accordance with the teachings of this disclosure. In the illustrated example, the example multiphase flow meter 102 is permanently coupled to an outlet 104 of a production manifold 106 that is coupled to a wellhead of a first oil well 108, to a wellhead of a second oil well 110 and to a wellhead of a third oil well 112. The first, second and third oil wells 108, 110 and 112 may be connected to the production manifold 106 individually and/or one by one and/or all together. In operation, the multiphase flow meter 102 determines a flow rate of fluid (e.g., gas, water, oil) flowing therethrough for individual wells and/or commingled wells.

Figure 2:
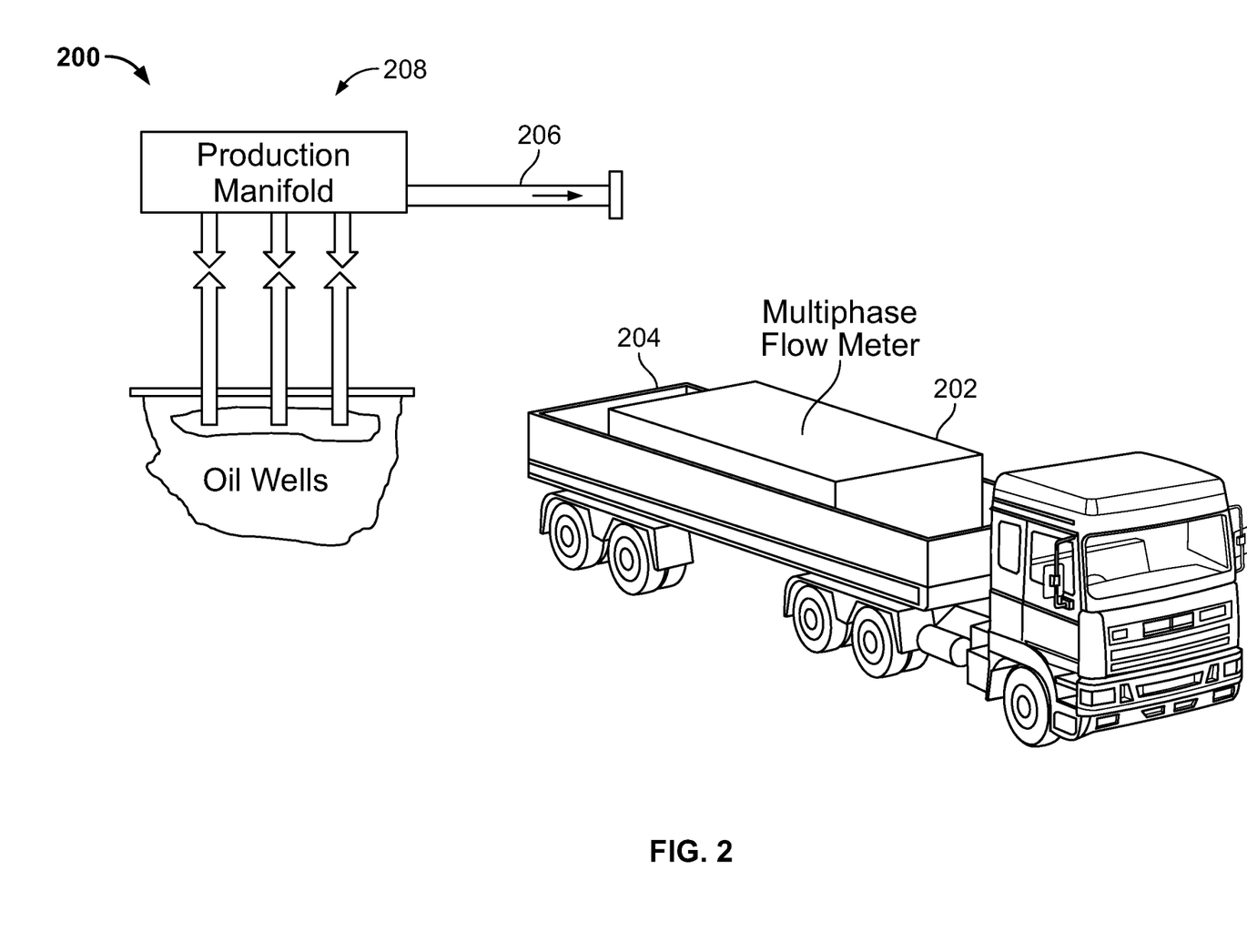
FIG. 2 illustrates an example mobile multiphase flow meter and an example wellhead.

FIG. 2 illustrates an example wellsite 200 and an example multiphase flow meter 202 in accordance with the teachings of this disclosure. In the illustrated example, the example multiphase flow meter 202 is disposed on a trailer 204 to enable the multiphase flow meter 202 to be mobile and/or transferred to and/or coupled at different wellsites. In operation, the multiphase flow meter 202 is coupled to a flowline 206 of a production manifold 208 to enable a flow rate of fluid (e.g., gas, water, oil) flowing through the multiphase flow meter 202 to be determined for individual wells and/or commingled wells.

Figure 3:
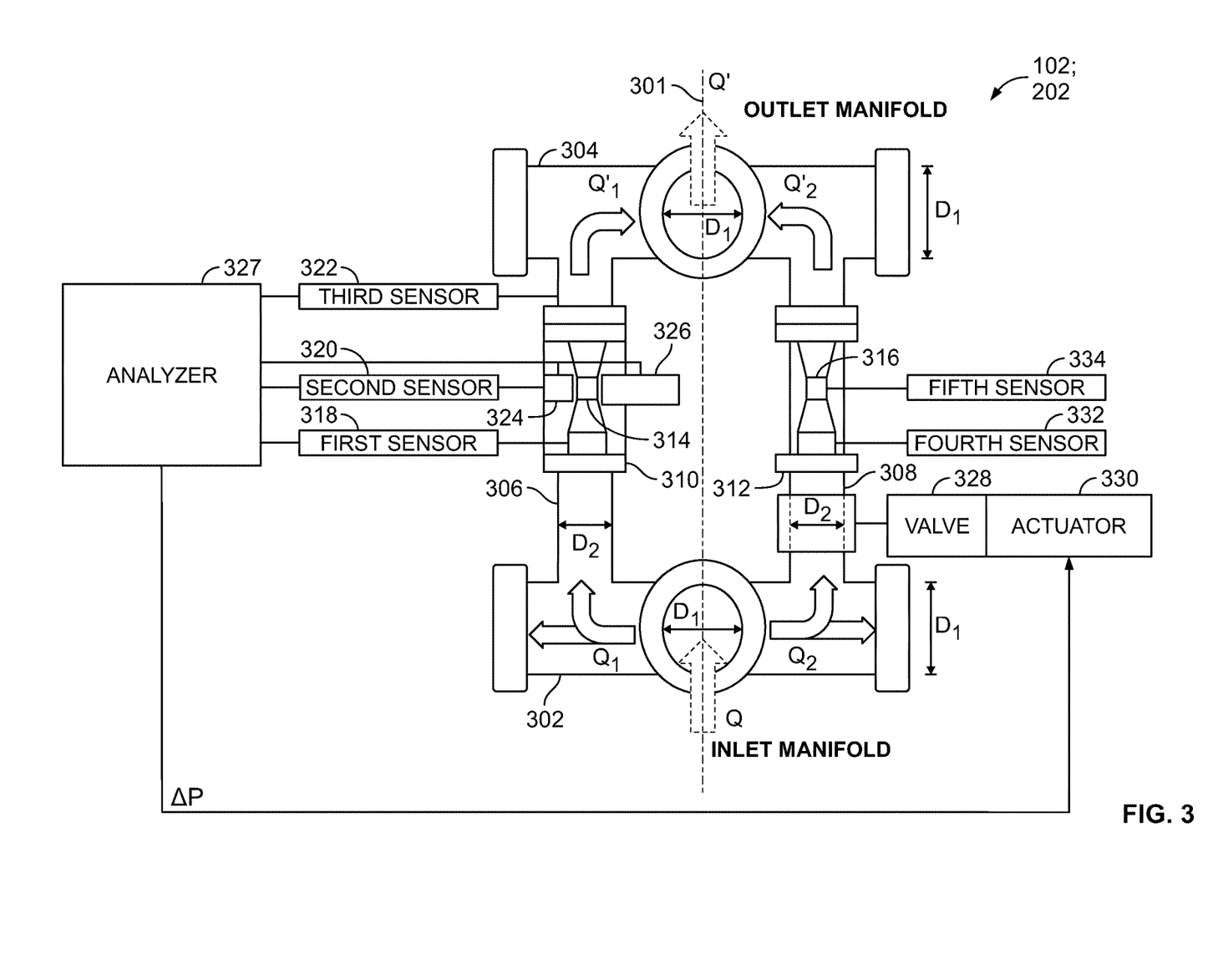
FIG. 3 illustrates an example multiphase flow meter that can be used to implement the example multiphase flow meters of FIGS. 1 and/or 2.

FIG. 3 illustrates an example implementation of the example multiphase flow meters 102, 202 of FIGS. 1 and 2. In the illustrated example, the multiphase flow meter 102, 202 is symmetric across and/or with respect to an axis 301 and includes an example inlet manifold 302, an example outlet manifold 304 and first and second flow paths 306, 308 coupled between the inlet and outlet manifolds 302, 304. While the example multiphase flow meter 102, 202 is illustrated as being symmetric across and/or with respect to the axis 301, in other examples, the multiphase flow meter 102, 202 may not be symmetric across and/or with respect to the axis 301. In some examples, the inlet manifold 302 splits the flow substantially equally between the first and second flow paths 306, 308 and the outlet manifold 304 receives the flow from the first and second flow paths 306, 308 at a substantially equal rate. In some examples, the internal dimensions of the first and second flow paths 306, 308 are substantially equally sized. As used herein, substantially equally sized means that the sizing of the first flow path 306 and the second flow path 308 are within about 1 percent of one another.

In the illustrated example, the first flow path 306 includes a first Venturi section 310 and the second flow path 308 includes a second Venturi section 312. In some examples, the first and second Venturi sections 310, 312 are substantially equally sized and the first and second flow paths 306, 308 are substantially parallel to one another. For example, first and second throats 314, 316 of the first and second Venturi sections 310, 312 may have an inner diameter of 65 mm. However, in other examples, the first and second throats 314, 316 and/or the first and second Venturi sections 310, 312 may have any suitable diameter and/or may be the same size and/or a different size such as, for example, a diameter of 29 mm, 40 mm and/or have a turndown ratio of 20:1.

In the illustrated example, to determine characteristics and/or parameters of the fluid flowing through the example multiphase flow meter 102, 202, the multiphase flow meter 102, 202 includes an example first sensor 318, an example second sensor 320, an example third sensor 322, an example source 324 and an example detector 326 all of which are coupled to an example analyzer 327. In some examples, the first and second sensors 318, 320 are pressure and differential-pressure sensors, the third sensor 322 is a temperature sensor, the source 324 is a gamma-ray source and the detector 326 is a gamma-ray detector.

In other examples, one or more of the first, second and third sensors 318, 320, 322, the source 324 and/or the detector 326 are single/dual energy gamma ray sensors when the flow through the multiphase flow meter 102, 202 is vertical or horizontal; single-modality electrical impedance sensors, high-energy gamma-ray sensors and/or X-ray sensors when the flow through the multiphase flow meter 102, 202 is vertical; dual-modality capacitance and conductance sensors and/or high-energy gamma-ray sensors when the flow through the multiphase flow meter 102, 202 is vertical or horizontal. Additionally and/or alternatively, one or more of the first, second and third sensors 318, 320, 322, the source 324 and/or the detector 326 are with microwave transmission antennas and/or high-energy gamma-ray sensors when the flow through the multiphase flow meter 102, 202 is vertical; sonar-array sensors and/or infrared sensors and/or high-energy gamma-ray sensors when the flow through the multiphase flow meter 102, 202 is vertical or horizontal; ultrasonic sensors when the flow through the multiphase flow meter 102, 202 is vertical or horizontal and/or microwave resonance sensor and/or high-energy gamma-ray sensor. In some examples, one or more sensors, sources and/or detectors may measure characteristics of the fluid flowing through the first and/or second flow paths 306, 308.

In the illustrated example, to control the flow through the second flow path 308, an example valve 328 is disposed in the second flow path 308. In some examples, an actuator 330 actuates the valve 328 based on differential pressure values determined by the first and second sensors 318, 320 and/or the analyzer 327. In some examples, based on the analyzer 327 determining that a pressure difference between the first and second sensors 318, 320 is approximately 5000 mbar and the valve 328 being in the closed position, the analyzer 327 causes the actuator 330 to actuate the valve 328 to the open position to enable fluid flow through the first and second flow paths 306, 308. In some examples, based on the analyzer 327 determining that a pressure difference between the first and second sensors 318, 320 is approximately 50 mbar and the valve 328 being in the open position, the analyzer 327 causes the actuator 330 to actuate the valve 328 to the closed position to reduce or prevent fluid flow through the second flow path 308.

In operation, the first, second and third sensors 318, 320, 322 measure parameters and/or characteristics of the fluid flowing through the first flow path 306 including, for example, the pressure of the fluid, the pressure difference of the fluid, the temperature of the fluid, etc. In some examples, the source 324 and/or the detector 328 are used to determine the phase fractions of the fluid flowing through the first flow path 306. To determine the flow rate of fluid flowing through the multiphase flow meter 102, 202 including the first and second flow paths 306, 308, the analyzer 327 obtains the values determined by the first, second and third sensors 318, 320, 322 and/or the source 324 and/or the detector 326 and processes the values using Equation 1, for example. Because, in some examples, the first flow path 308 is sized substantially similarly to the second flow path 308 and the flow rates through the first and second flow paths 308, 308 are substantially similar, the example multiphase flow meter 102, 202 may include the sensors 318, 320, 322, the source 324 and the detector 326 at the first flow path 306 but not Include sensors, sources and/or detectors at the second flow path 308. Thus, characteristics of the fluid flowing through the second flow path 308 may be determined without directly measuring the fluid flowing through the second flow path 308.

Total Flowrate=scaling factor×flowrate of first flow path      Equation 1:

in some examples in which the valve 328 is actuated to enable fluid flow through the second flow path 308, the analyzer 327 may set the scaling factor as two or a number other than one. In some examples in which the valve 328 is actuated to prevent fluid flow through the second flow path 308, the analyzer 327 may set the scaling factor as one.

In the illustrated example, to enable the flow rates through the first and second flow paths 306, 308 to be compared and/or to determine the flow rate through the second flow path 308, the example multiphase flow meter 102, 202 includes a fourth sensor 332 and a fifth sensor 334. In some examples, to determine the flow rates through the first and second flow paths 306, 308, the analyzer 327 obtains pressure values from the first and second sensors 318, 320 to determine a first pressure difference through the first flow path 306 and obtains pressure values from the fourth and fifth sensors 332, 334 to determine a second pressure difference through the second flow path 308. In some examples, to determine if the flow rate through the first flow path 306 is similar to the flow rate through the second flow path 308, the analyzer 327 compares the first and second pressure differences and determines if a difference between the first and second pressure differences satisfies a threshold. In examples in which the first and second pressure differences satisfy a threshold, the analyzer 327 may determine that the flow through the first flow path 306 is substantially equal to the flow through the second flow path 308. In examples in which the first and second pressure differences do not satisfy a threshold, the analyzer 327 may determine that the flow through the first flow path 306 is not substantially equal to the flow through the second flow path 308. In examples in which the first and second pressure differences do not satisfy the threshold, the analyzer 327 may dynamically adjust the scaling factor used in Equation 1 when determining the flow rate through the multiphase flow meter 102, 202.

In some examples, the analyzer 327 may use the values obtained from the fourth and fifth sensors 332, 334 to determine the health of the valve 328. For example, if the analyzer 327 identifies the valve 328 as being in the closed position and identifies fluid flow through the second flow path 308 based on the difference of values and/or pressure values obtained by the fourth and fifth sensors 332, 334, the analyzer 327 may provide an alert that the valve 328 and/or the actuator 330 is to be repaired and/or replaced.

Figure 4:
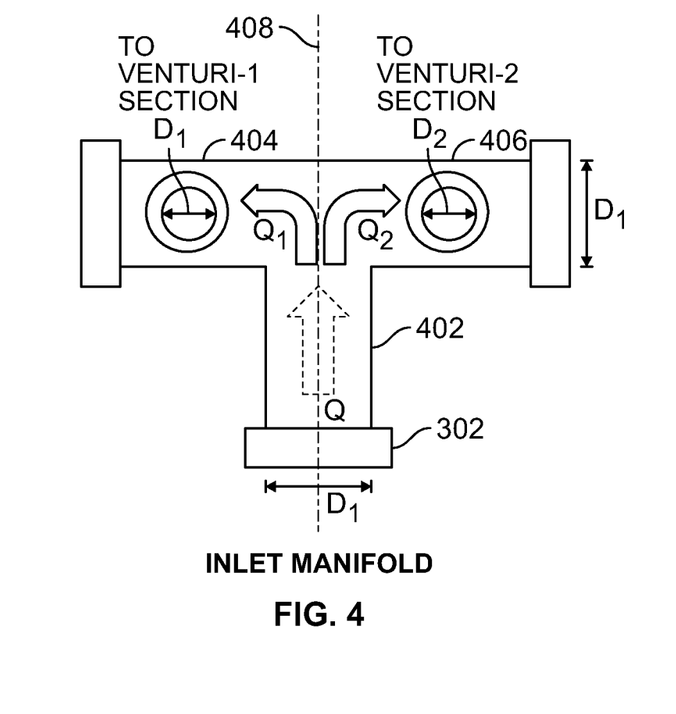
FIG. 4 illustrates a first portion of the example multiphase flow meter of FIG. 3.

FIG. 4 illustrates a detailed view of the inlet manifold 302 of the multiphase flow meter 102, 202 of FIGS. 1-3. In this example, the inlet manifold 302 includes a first portion 402, a second portion 404 and a third portion 406 where the inlet manifold 302 is symmetric about an axis 408. In operation, fluid flowing through the first portion 402 splits substantially equally to the second and third portions 404, 406 at an intersection between the first portion 402 and the second and third portions 404, 406.

Figure 5:
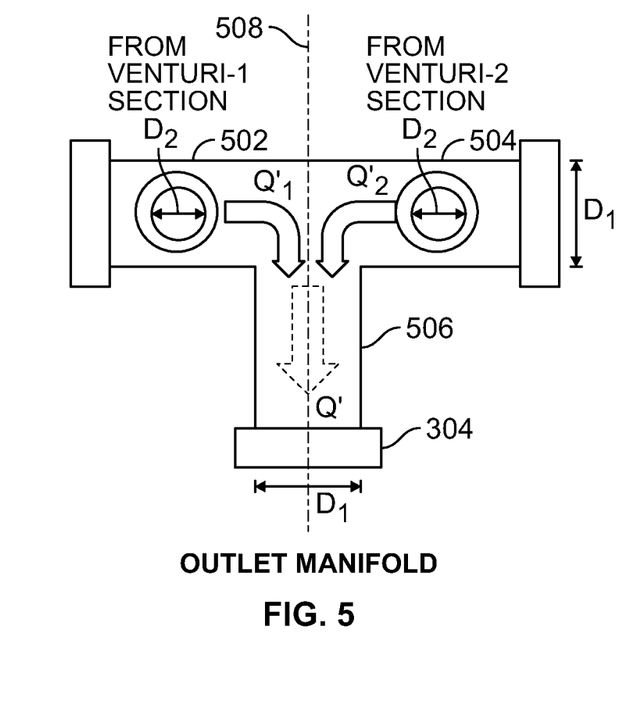
FIG. 5 illustrates a second portion of the example multiphase flow meter of FIG. 3.

FIG. 5 illustrates a detailed view of the outlet manifold 304 of the multiphase flow meter 102, 202 of FIGS. 1-3. In this example, the outlet manifold 304 includes a first portion 502, a second portion 504 and a third portion 506 where the outlet manifold 304 is symmetric about an axis 508. In operation, fluid flowing through the first and second portions 502, 504 enters the third portion 506 at a substantially equal rate at an intersection between the first and second portions 502, 504 and the third portion 506.

Figure 6:
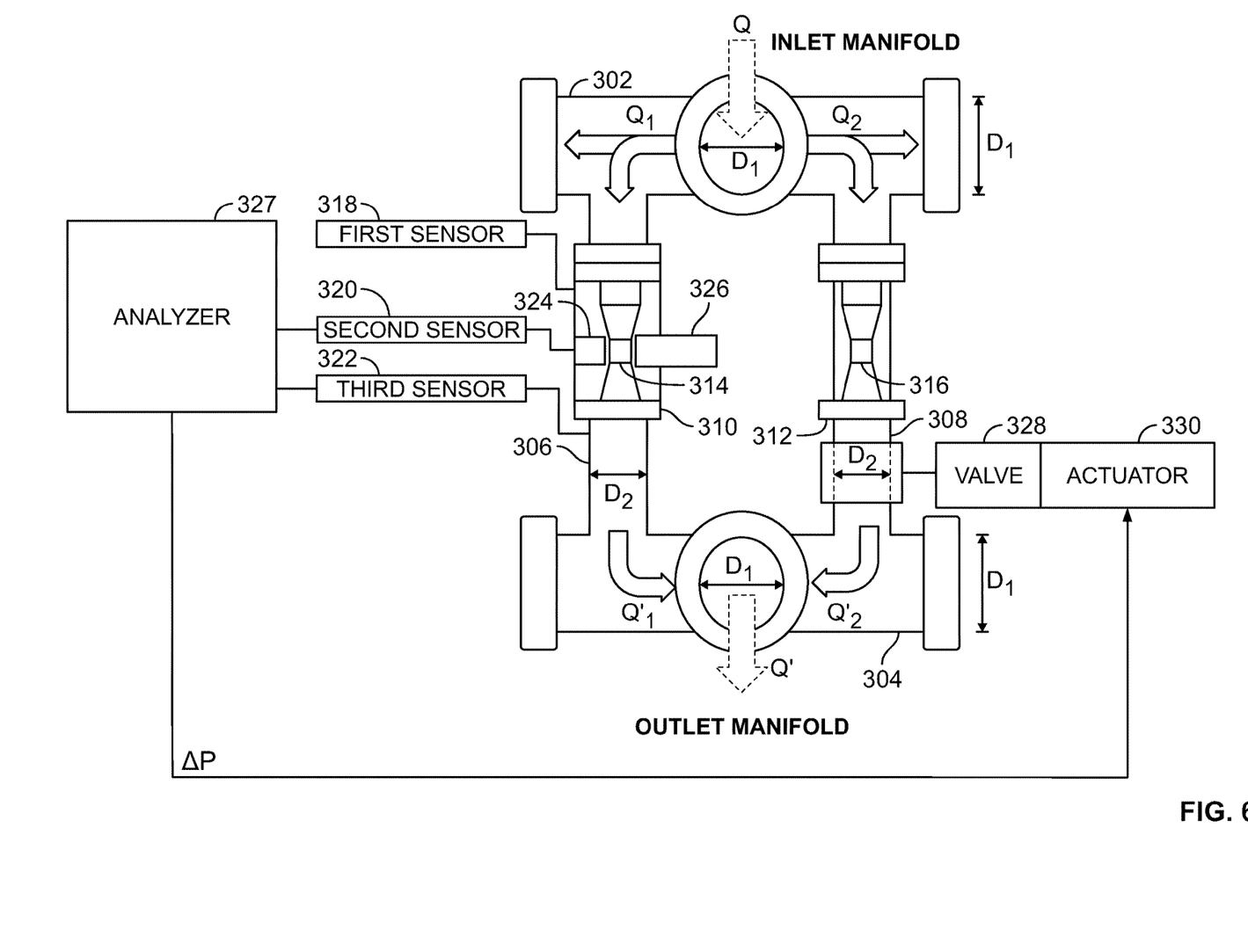
FIG. 6 illustrates another example multiphase flow meter that can be used to implement the example multiphase flow meters of FIGS. 1 and/or 2.

FIG. 6 illustrates another example implementation of the example multiphase flow meters 102, 202 of FIGS. 1 and 2. In contrast to the example multiphase flow meter shown in FIG. 3, the example multiphase flow meter 102, 202 of FIG. 6 is oriented to enable fluid to flow downwardly through the multiphase flow meter 102, 202 instead of upwardly. In other examples, the multiphase flow meters disclosed herein can be mounted in any suitable origination to enable fluid flow through the multiphase flow meter 102, 202 vertically upward, vertically downward, horizontally, diagonally, etc.

Figure 7:
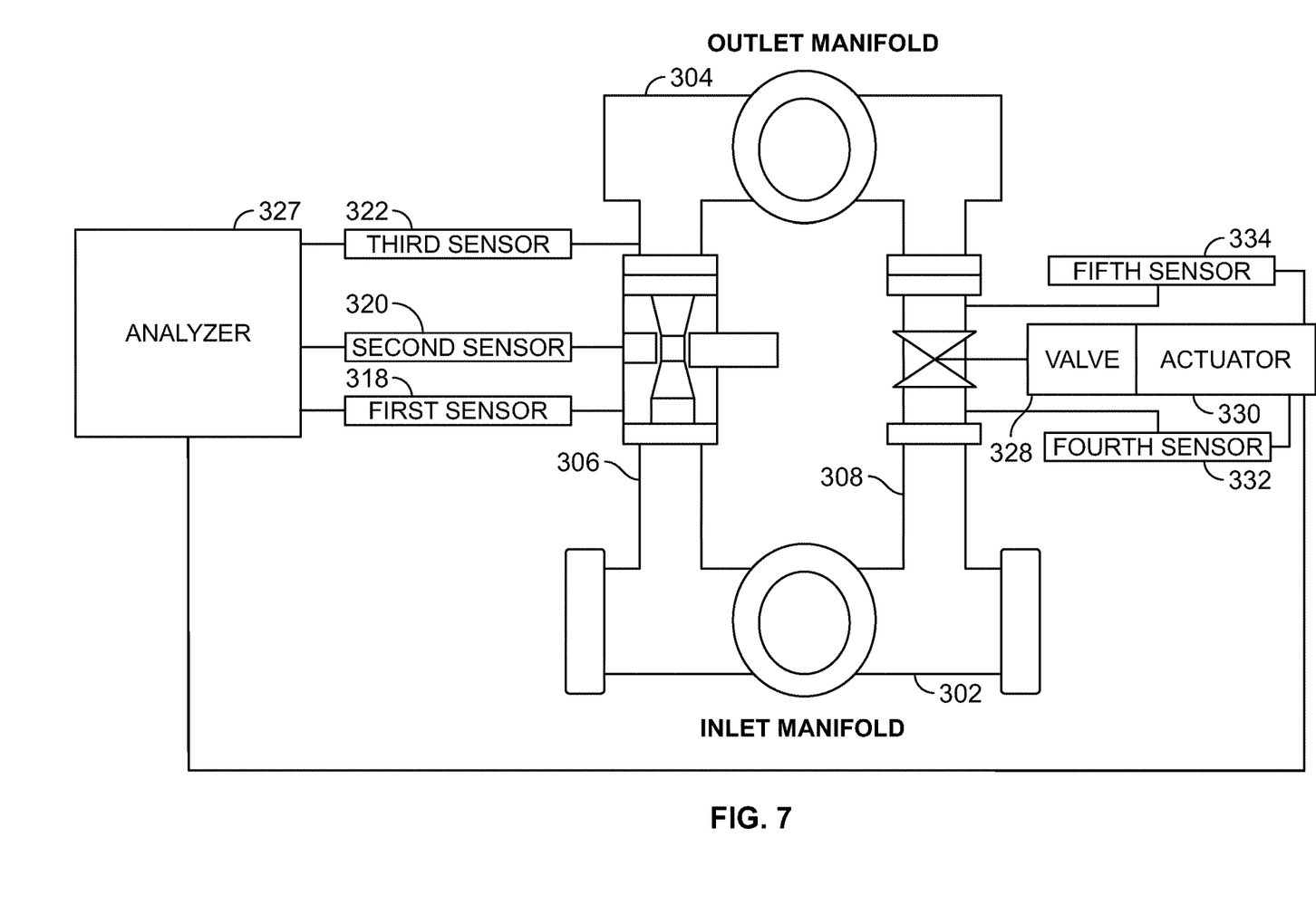
FIG. 7 illustrates another example multiphase flow meter that can be used to implement the example multiphase flow meters of FIGS. 1 and/or 2.

FIG. 7 illustrates another example implementation of the example multiphase flow meters 102, 202 of FIGS. 1 and 2 that may be used to increase an upper range of the flow measurement and increase the turndown ratio by arranging the first and second flow paths 306, 308 in an unsymmetrical manner, for example. In the example of FIG. 7, the fourth and fifth sensors 332, 334, the valve 328 and the actuator 330 are implemented as a differential pressure control valve. As such, in this example and based on the position of the valve 328 (e.g., 100% open, 75% open, 50% open, 25% open), the flow rate through the first flow path 306 may be different than the flow rate through the second flow path 308 such that the flow rates through the first and second flow paths 306, 308 are different. Thus, using the example of FIG. 7, the analyzer 327 may dynamically adjust the scaling factor of Equation 1 based on the position of the valve 328. In some examples, the analyzer 327 may dynamically adjust the position of the valve 328 based on a pressure difference obtained by one or more of the first sensor 318, the second sensor 320, the fourth sensor 332 and the fifth sensor 334.

The example analyzer 327 of FIGS. 3, 6 and 7 and, more generally, the example multiphase fluid meter 102, 202 may be implemented by hardware, software, firmware and/or any combination of hardware, software and/or firmware. Thus, for example, any of the example analyzer 327 and/or, more generally, the example multiphase flow meter 102, 202 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example analyzer 327 and/or the example multiphase flow meter 102, 202 is/are hereby expressly defined to include a tangible computer readable storage device or storage disk such as a memory, a digital versatile disk (DVD), a compact disk (CD), a Blu-ray disk, etc. storing the software and/or firmware. Further still, the example analyzer 327 of FIGS. 3, 6 and 7 may include one or more elements, processes and/or devices in addition to, or instead of, those illustrated in FIGS. 3, 6 and 7, and/or may include more than one of any or all of the illustrated elements, processes and devices.

Figure 8:
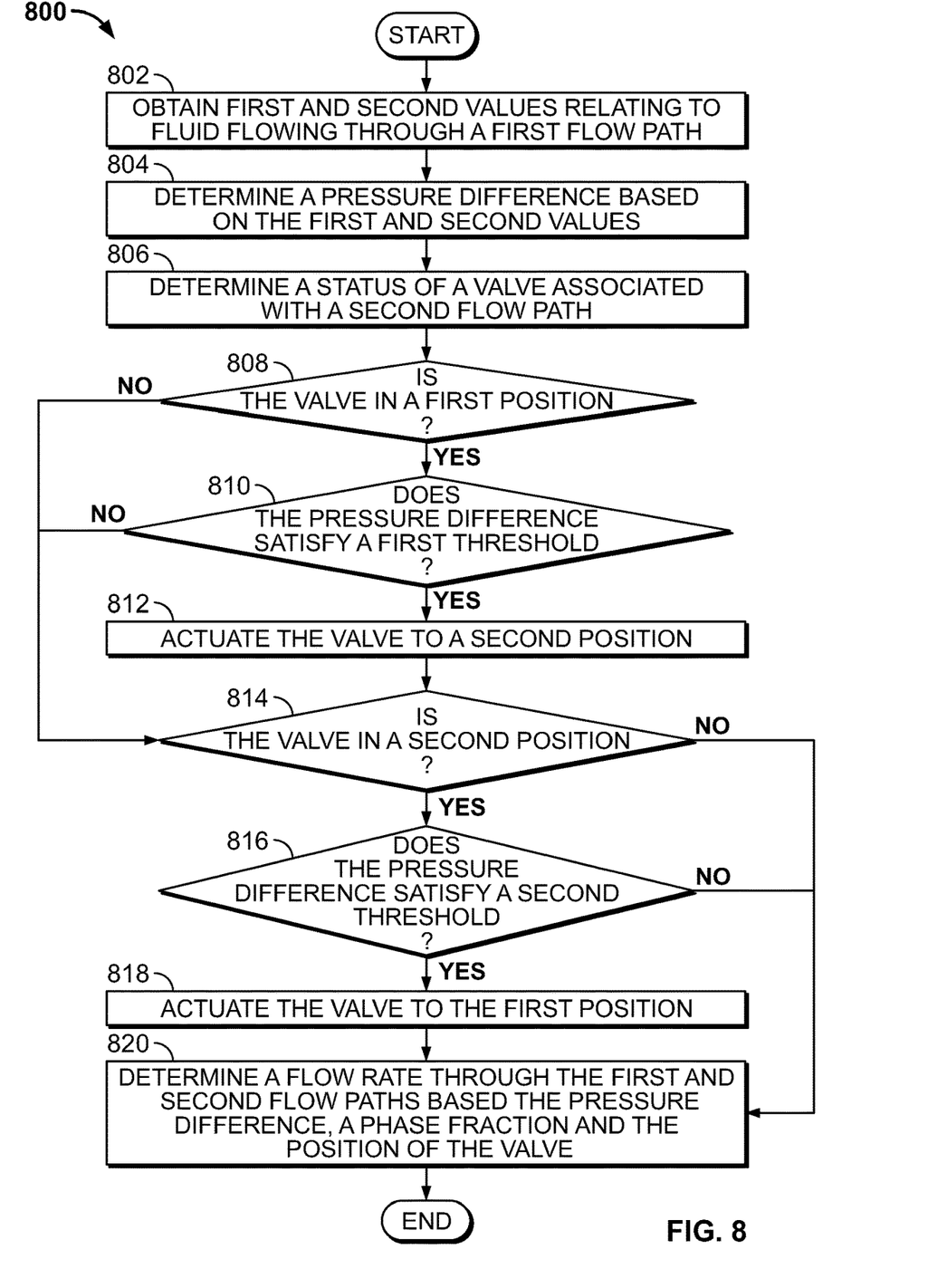
FIG. 8 is a flowchart representative of a method that may be used to implement the analyzer of the example multiphase flow meters disclosed herein.

A flowchart representative of an example method 800 for implementing the analyzer 327 of FIGS. 3, 6 and 7 is shown in FIG. 8. In this example, method 800 may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example analyzer 327 may alternatively be used. For example, the order of execution of the blocks may be changed, and/or some of the blocks described may be changed, eliminated, or combined.

As mentioned above, the example method 800 of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method 800 of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The method 800 of FIG. 8 begins by first and second values being obtained relating to fluid flowing through a first flow path (block 802) by, for example, the analyzer 327 obtaining values from one or more of the first sensor 318, the second sensor 320, the third sensor 322, the source 324 and/or the detector 326. A pressure difference is determined (block 804) by, for example, the analyzer 327 determining a difference between pressure values obtained by from the first and second sensors 318, 320. In other examples, the analyzer 327 may determine a difference between pressure values obtained by the fourth and fifth sensors 332, 334. A status of a valve associated with a second flow path is determined (block 806) by, for example, the analyzer 327 identifying a position of the valve 328 and/or the actuator 330 associated with the second flow path 308.

The method 800 then determines if the valve is in a first position (block 808) by, for example, the analyzer 327 determining if the valve 328 is in the first position. In some examples, the first position is associated with the valve being in an open position, a partially open position or a closed position. If the valve is in the first position, the method 800 determines if the pressure difference satisfies a first threshold (block 810) by, for example, comparing the pressure difference to a first reference pressure difference. If the pressure difference does not satisfy the first threshold, the valve is actuated to a second position (block 812) by, for example, the analyzer 327 causing the actuator 330 to actuate the valve 328. In some examples, the second position is associated with the valve 328 being in an open position, a partially open position or a closed position.

The method determines if the valve is in a second position (block 814) by, for example, the analyzer 327 determining if the valve 328 is in the second position. If the valve is in the second position, the method determines if the pressure difference satisfies a second threshold (block 816) by, for example, comparing the pressure difference to a second reference pressure difference. If the pressure difference does not satisfy the second threshold, the valve is actuated to the first position (block 818) by, for example, the analyzer 327 causing the actuator 330 to actuate the valve 328. At block 820, the method determines the flow rate through the first and second flow paths based on the pressure difference, a phase fraction and the position of the valve (block 820) by, for example, the analyzer 327 determining the flow rate flowing through the first and second flow paths 306, 308 using Equations 1-5, for example. In some examples, the phrase fraction is used to determine, for example, mixture density.

Figure 9:
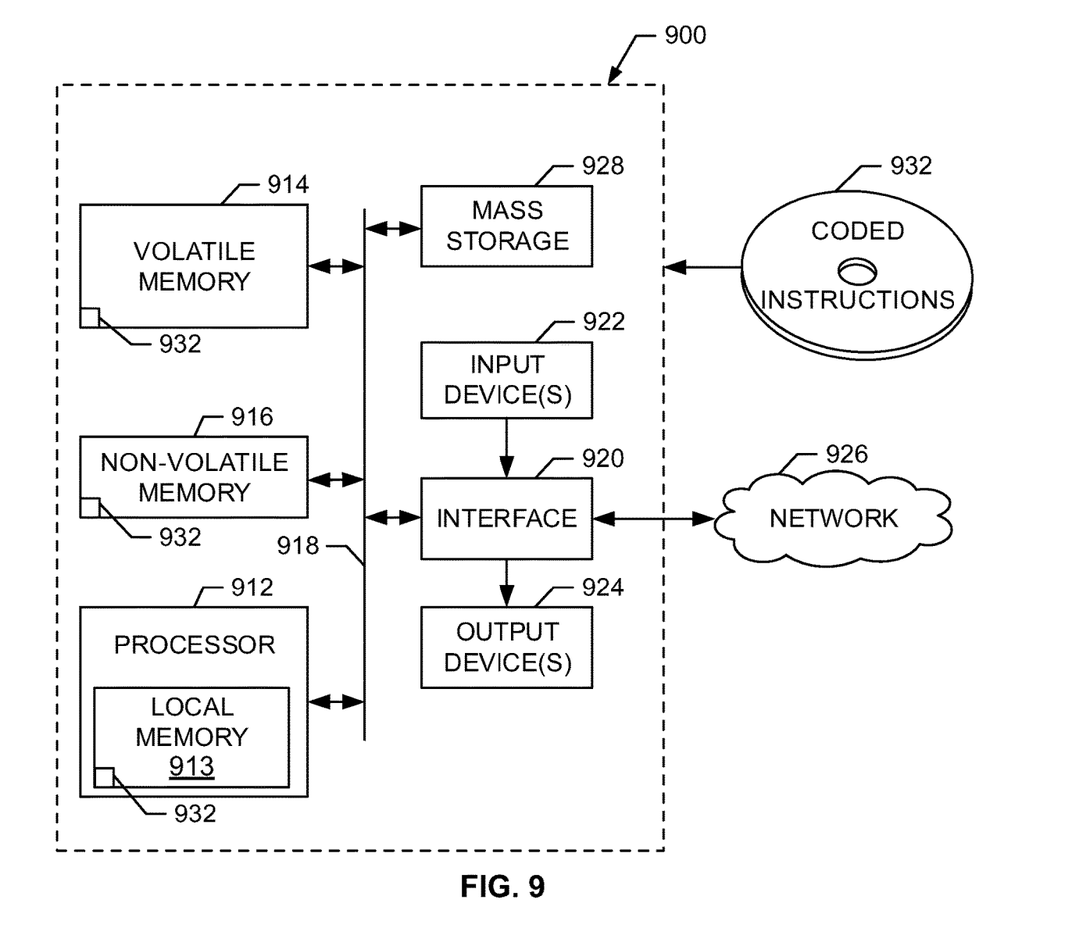
FIG. 9 is a processor platform to execute the instructions to implement the method of FIG. 8 and the analyzer of the example multiphase flow meters disclosed herein.

FIG. 9 is a block diagram of an example processor platform 900 capable of executing instructions to implement the method 800 of FIG. 8 and the analyzer and/or the multiphase flow meter of FIGS. 1-7. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the method 800 of FIG. 8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture relate to example multiphase flow meters that may be used in any suitable situation such as, for example, subsea operations, topside operations, land-based operations, offshore-platform operations, etc. In some examples, the example multiphase flow meters include first and second Venturi sections that are spaced and/or sized to enable fluid flow through the first and second Venturi sections to be substantially equal. As such, characteristics of the fluid and/or fluid flow through the first Venturi section may be used to determine characteristics of the fluid and/or fluid flow through the second Venturi section. In some examples, the multiphase flow meters disclosed herein may be used to measure phase fraction, pressure, and temperature when the example flow meters are disposed such that the fluid flows horizontally and/or in an inclined manner in which gravity acts substantially symmetrically on the flow sections, inlet manifold and/or outlet manifold of the multiphase flow meter.

Multiple-energy gamma ray sensors, sources and/or detectors may be used to implement the examples disclosed herein. In addition, Venturis and single/dual energy gamma ray sensors may be used to implement the examples disclosed herein. In some examples, Venturi and single-modality electrical impedance sensors, high-energy gamma-ray or X-ray options and/or sensors may be used to implement the examples disclosed herein. In some examples, Venturi and dual-modality capacitance and conductance sensors and/or high-energy gamma-ray options and/or sensors may be used to implement the examples disclosed herein. In some examples, Venturi and microwave transmission antennas, high-energy gamma-ray Venturi, sonar-array and/or infrared sensors and/or high-energy gamma-ray options and/or sensors may be used to implement the examples disclosed herein. In some examples, Venturi and/or orifice plates, and ultrasonic sensors may be used to implement the examples disclosed herein. In some examples, Venturi (with dual-dP measurement) and microwave resonance sensors or the like may be used to implement the examples disclosed herein. In some examples, sensors mounted in one of the vertical/horizontal/inclined flow sections of a full-bore pipe or pipe with flow restriction(s), and without and/or with other sensor(s) mounted in a symmetrically arranged second vertical/horizontal/inclined section may be used to implement the examples disclosed herein.

An example apparatus includes an inlet manifold; an outlet manifold, first and second flow paths coupled between the inlet and outlet manifolds; and an analyzer to determine a flow rate of fluid flowing through the first and second flow paths based on a parameter of the fluid flowing through the first flow path. In some examples, the parameter is a pressure difference, a phase fraction, a mixture density of the fluid flowing through the first flow path. In some examples, the first flow path includes a first Venturi section and the second flow path includes a second Venturi section. In some examples, the apparatus includes one or more sensors coupled to the first flow path, the one or more sensors to obtain values used by the analyzer to determine the parameter. In some examples, the apparatus includes a source and a detector coupled to the first flow path, the analyzer to use values obtained by the detector to determine a phase fraction of the fluid flowing through the first flow path. In some examples, the analyzer is to use values obtained by the detector to determine a phase fraction of the fluid flowing through the second flow path. In some examples, the first flow path is substantially equally sized to the second flow path.

In some examples, the apparatus includes a valve to control fluid flow through the second flow path. In some examples, the analyzer is to actuate the valve from a first position to a second position based on the pressure difference satisfying a first threshold, the analyzer is to actuate the valve from the second position to the first position based on the pressure difference satisfying a second threshold. In some examples, the apparatus is a mobile multiphase flow meter. In some examples, the apparatus is a permanently-installed multiphase flow meter. In some examples, the analyzer is to determine the flow rate of the fluid flowing through the first and second flow paths without directly measuring a parameter of the fluid flowing through the second path. In some examples, the first flow path is substantially parallel to the second flow path.

An example apparatus includes an inlet manifold; an outlet manifold; first and second flow paths coupled between the inlet and outlet manifolds; and means for determining a characteristic of fluid flowing through the first and second flow paths without directly measuring a parameter of the fluid flowing through the second flow path. In some examples, the means for determining the characteristic of the fluid flowing through the first and second flow paths includes an analyzer to determine a parameter of the fluid flowing through the first flow path. In some examples, the parameter is a pressure difference, a phase fraction, a mixture density of the fluid flowing through the first flow path. In some examples, the apparatus includes one or more sensors coupled to the first flow path, the one or more sensors to obtain values used by the analyzer to determine the parameter.

In some examples, the apparatus includes a source and a detector coupled to the first flow path, the analyzer to use values obtained by the detector to determine a phase fraction of the fluid flowing through the first flow path. In some examples, the analyzer is to use values obtained by the detector to determine a phase fraction of the fluid flowing through the second flow path. In some examples, the first flow path is substantially equally sized to the second flow path.

An example method includes determining a parameter of a fluid flowing through a first flow path of a multiphase flow meter; and based on the parameter, determining a flow rate through the first flow path and the second flow path without directly measuring the flow rate through the second flow path.

In the specification and appended claims: the terms "connect," "connection," "connected," "in connection with," and "connecting" are used to mean "in direct connection with" or "in connection with via one or more elements;" and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "upper" and "lower," "upwardly" and "downwardly," "upstream" and "downstream;" "above" and "below;" and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An apparatus for determining a flow rate of a multiphase fluid, comprising:
   an inlet manifold;
   an outlet manifold;
   first and second flow paths each extending from the inlet manifold to the outlet manifold and coupled to the inlet and outlet manifolds; and
   one or more sensors coupled to the first flow path to measure values of one or more characteristics of the fluid in the first flow path,
   an analyzer to determine a flow rate of fluid flowing through the first and second flow paths based on at least one parameter of the fluid flowing through the first flow path, wherein the at least one parameter includes a mixture density of the fluid flowing through the first path and is determined based on the values obtained by the one or more sensors.

2. The apparatus of claim 1, wherein the at least one parameter further includes a pressure difference of the fluid flowing through the first flow path.

3. The apparatus of claim 1, wherein the first flow path includes a first Venturi section and the second flow path includes a second Venturi section.

4. The apparatus of claim 3, wherein the one or more sensors are one or more first sensors, further comprising one or more second sensors coupled to the second flow path to measure values of one or more characteristics of the fluid in the second flow path, wherein the analyzer is configured to determine a first pressure difference across the first flow path based on the values obtained by the one or more first sensors and a second pressure difference across the second flow path based on the values obtained by the one or more second sensors, and to adjust the scaling factor based on a comparison of the first and second pressure differences.

5. The apparatus of claim 1, wherein the one or more sensors include a source and a detector, wherein the analyzer is configured to use values obtained by the detector to determine a phase fraction of the fluid flowing through the first flow path, wherein the phase fraction is used to determine the mixture density.

6. The apparatus of claim 5, wherein the analyzer is to use values obtained by the detector to determine a phase fraction of the fluid flowing through the second flow path.

7. The apparatus of claim 1, wherein the first flow path is substantially equally sized to the second flow path.

8. The apparatus of claim 1, further including a valve to control fluid flow through the second flow path.

9. The apparatus of claim 8, wherein the analyzer is to actuate the valve from a first position to a second position based on the pressure difference satisfying a first threshold, the analyzer is to actuate the valve from the second position to the first position based on the pressure difference satisfying a second threshold.

10. The apparatus of claim 1, wherein the apparatus is at least one of a mobile multiphase flow meter or a permanently-installed multiphase flow meter.

11. The apparatus of claim 1, wherein the analyzer is to determine the flow rate of the fluid flowing through the first and second flow paths without determining the mixture density of the fluid flowing through the second path on the basis of values of characteristics measured by one or more sensors coupled to the second flow path.

12. The apparatus of claim 1, wherein the first flow path is substantially parallel to the second flow path.

13. The apparatus of claim 1, wherein the analyzer is configured to determine the flow rate flowing through the first and second flow paths based on a flow rate flowing through the first flow path determined based on the at least one parameter and on a scaling factor.

14. A method for determining a flow rate of a multiphase fluid, comprising:
   measuring values of one or more characteristics of the fluid in a first flow path of a multiphase flow meter at a wellsite using one or more sensors coupled to the first flow path,
   determining at least one parameter of a fluid flowing through the first flow path wherein the at least one parameter includes a mixture density of the fluid flowing through the first path and is determined based on the values obtained by the one or more sensors; and
   based on the parameter, determining a flow rate through the first flow path and a second flow path.

15. The method according to claim 14, wherein it comprises determining the flow rate of the fluid flowing through the first and second flow paths without determining the mixture density of the fluid flowing through the second path on the basis of values of characteristics measured by one or more sensors coupled to the second flow path.

* * * * *